Figure 1:
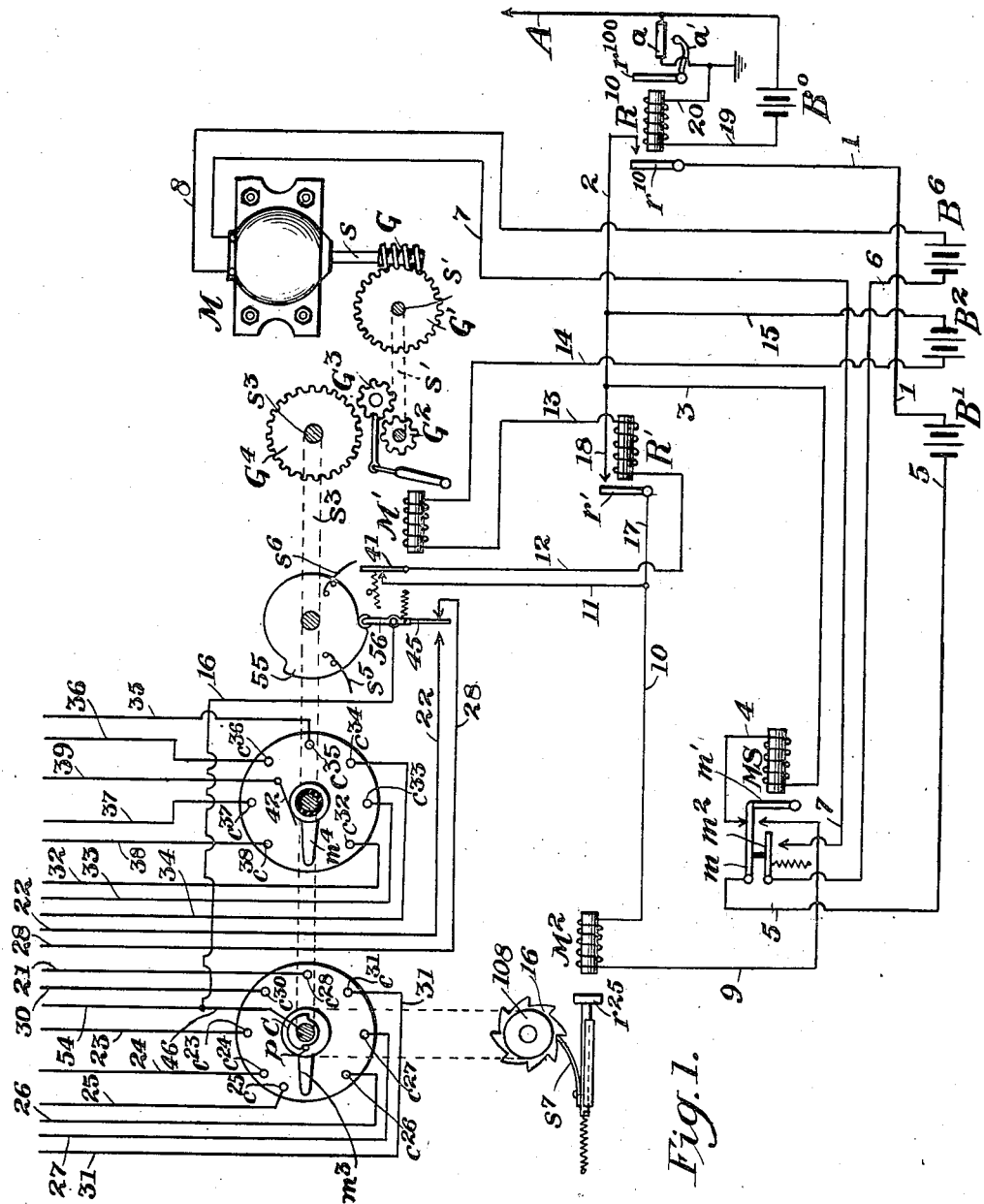

UNITED STATES PATENT OFFICE.

LEE B. CLARK AND RAYMOND A. CLARK, OF MUTUAL, OKLAHOMA, ASSIGNORS, BY MESNE ASSIGNMENTS, TO CLARK BROTHERS WIRELESS SELECTION AND CONTROL COMPANY, OF PHOENIX, ARIZONA, A CORPORATION OF ARIZONA.

SYSTEM OF DISTANT SELECTION AND CONTROL BY MEANS OF ELECTROMAGNETIC WAVES.

1,172,515.      Specification of Letters Patent.      Patented Feb. 22, 1916.

Application filed January 24, 1910, Serial No. 539,898. Renewed July 12, 1915. Serial No. 39,499.

*To all whom it may concern:*

Be it known that we, LEE B. CLARK and RAYMOND A. CLARK, citizens of the United States, residing at Mutual, county of Woodward, and State of Oklahoma, have invented a certain new and useful system of distant selection and control by means of electromagnetic waves, without necessity for synchrony of emitting and receiving parts, designed especially for distant control of torpedoes, boats, and vehicles or other devices desired to be so operated, of which method or system the following is a specification.

Our invention relates to the control of objects and mechanism from a distance by means of electromagnetic waves, and has for its object the production of a system and apparatus by means of which selection may be effected with ease and certainty, and the efficiency of operation may be increased.

Broadly stated, our system comprises, in addition to means for emitting waves in predetermined sequence, receiving apparatus and circuits which can be first set by the initial impulses so as to determine selectively the connection and energization of controlling elements such as relays, and therefore the selective elements can be positively operated to produce the desired effect.

More specifically stated, the system we shall disclose herein as the best embodiment of our invention known to us at the time of filing this application, includes a receiving relay which is responsive to all impulses, a set of controlling relays for selection, a set of operating relays controlled by the first relays, and a driven switch containing contacts in the circuits of the several relays, and having a pair of wipers with a motor for driving them in synchronism to produce simultaneous contacts, and a selector magnet controlled by the receiving relay and acting independently of the motor on one wiper only so as to give said wiper a lead by moving it in advance of its mate to prevent simultaneous contact during any desired number of steps or intervals in the passage of the wipers over the relay circuit contacts.

Our invention is well adapted for the control of dirigible balloons, torpedoes, and the like; and it permits simultaneous control and operation of two or more of these agencies, the connection of the control relays thereon being alternated or shifted so that each may be selectively affected to the exclusion of the other or others. In the case of torpedoes for example, two or more may be launched, on either one of which the mechanism may be locked so as to be unaffected by the waves, and the other may then be steered, started, stopped, exploded, etc., at will. This feature of individual control, as well as other characteristic features of our invention, we believe to be novel and original with us, and shall claim the same accordingly.

Our invention is illustrated in the accompanying drawings, in which:—

Figure 2:
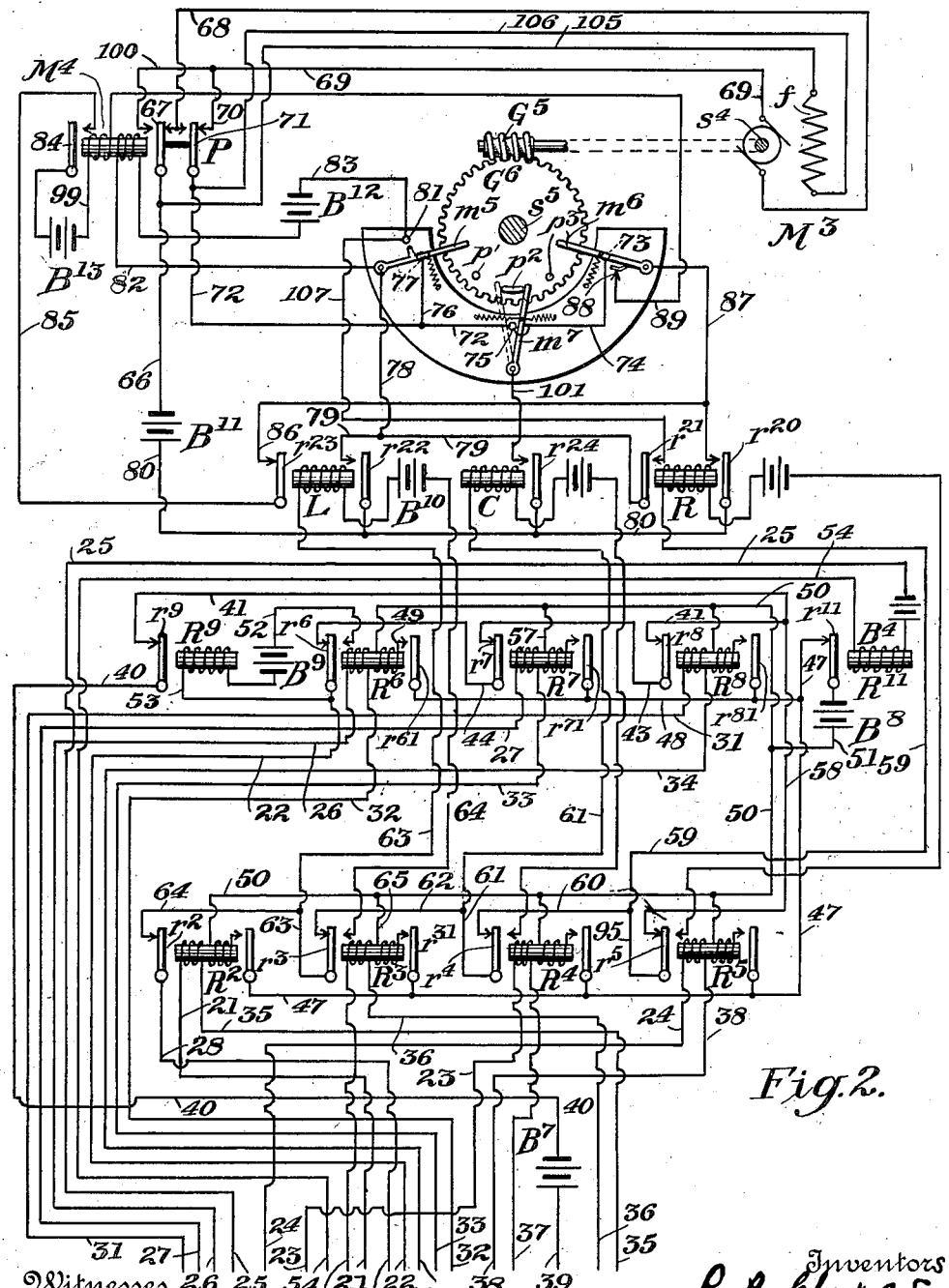

Figures 1 and 2 are complementary diagrams showing the receiving apparatus and circuits.

We do not illustrate herein any means for emitting or transmitting the electromagnetic waves, as these may be of any well known or desired form, such for example as those shown in Letters Patent No. 913,814 granted March 2, 1909 to L. E. Custer, or No. 767,492 granted August 16, 1904 to McCaughey. We may conveniently employ for this purpose a rotating shaft carrying a series of contact fingers arranged to make a break with contact points suitably fixed, with connections such that a circuit may be closed through any contact finger and its points by means of a corresponding switch or key, said circuit including a transformer or induction coil and the other usual agencies for the generation of electromagnetic waves. By varying the number of the fingers or co-operating points, or both, each key when depressed may be arranged to send a definite number of impulses or series of waves, in a manner which will be sufficiently apparent to those skilled in the art.

The circuits and apparatus herein shown are designed for the control of two boats or two torpedoes, or for two groups of the same. The control is accomplished by two groups of impulses, first a selecting group, and then after a brief interval, an operating group. Both boats respond to the first or selecting group of impulses which renders either or both boats operatively responsive to the subsequent operating impulses, e. g. one selective impulse would disable boat No. 1, leaving boat No. 2 operatively responsive to the subsequent operating impulses; two selective impulses would disable boat No. 2, leaving boat No. 1 responsive, and three impulses would disable neither and therefore leave both boats operatively responsive to the operating impulses. In the accompanying drawings only one set of circuits and apparatus is shown, that of boat No. 1, that of boat No. 2 being identical, with the exception that the disabling function is assigned to a different relay.

The receiving apparatus, exclusive of the controlled mechanism such as the propelling motor, rudder, and other parts of the torpedo or balloon, is divided into four portions. The first comprises the receiving relay $R^{10}$, with its associated aerial conductor A and coherer or equivalent wave detector $a$, these parts responding to all waves or impulses; the second division includes the motor M, controlling the selective switch wipers $m^3$, $m^4$, the associated selector magnet $M^2$, which acts upon the wiper $m^3$ only, and the auxiliary relays $R'$ and MS; the third division includes the selective controlling relays $R^6$, $R^7$, $R^8$, etc.; and the fourth division includes the operating relays $R^2$, $R^3$, $R^4$, etc. The apparatus in these four divisions will first be briefly described, and then the circuits will be traced in giving a detailed statement of the operation.

The relay $R^{10}$ is of any suitable type, having a contact armature $r^{10}$ and conveniently fitted with a tapper armature $r^{100}$ carrying a tapper $a'$ for the coherer $a$. The conductors A, 19, 20, and the associated parts $a$, $a'$ are to be understood as typical only, as any others well known in the art may be substituted therefor without affecting the present invention. The relay $R^{10}$ controls the local circuit 1—2 in which are included the motor starting magnet MS, a locking relay $R'$, and the switch starting magnet $M'$. The magnet MS is fitted with an armature $m'$ which normally maintains contacts $m$, $m^2$ in the position shown in Fig. 1, keeping the circuits 7 and 9 open, and the circuit 4 of the magnet itself closed. These parts require resetting after operation. 7 is the circuit of the motor M and 9 is the circuit of the selector magnet $M^2$. The motor M is of any convenient type, connected to a short jack shaft $s'$ through a worm and gear G—G'. When the motor is started, the shaft $s'$ is rotated idly unless the magnet $M'$ is simultaneously energized, the effect of which is to pull over an idle wheel $G^3$ into mesh with the pinion $G^2$ and the switch gear $G^4$. The showing of these gears and pinions is diagrammatic, and in practice the idler $G^3$ is fitted with suitable guides so that it may be thrown into and out of mesh with certainty through a short path of travel. The locking relay $R'$ is of ordinary type, and when energized in series with MS and $M'$, it closes a short locking circuit $R'$, 13, $M'$, 14, $B^2$, 15, 18, $r'$, 17, through itself and the magnet $M'$, the latter being energized to keep the gears $G^2$, $G^3$, $G^4$, in mesh while the stepping magnet $M^2$ is operated intermittently by the receiving relay $R^{10}$. This locking circuit is maintained idle the switch wipers $m^3$—$m^4$ having passed through a certain arc of travel, and is then opened in a manner which will presently be described.

The second division of apparatus, beside the motor already referred to, includes particularly the switch with its associated parts. There are three moving elements to this switch, viz., the wipers $m^3$ and $m^4$, and the cam 55 carrying spring fingers $s^5$ and $s^6$ set so as to open the locking circuit of the relay $R'$ at predetermined points. The switch elements are all driven by the motor through the shaft $s^3$, which is rigidly secured to the gear $G^4$, the cam 55, the wiper arm $m^4$, and the mutilated sleeve C coöperating with a stud $p$ on the hub of the wiper arm $m^3$. The gear $G^4$, the cam 55, and the wiper $m^4$ always move in synchronism, and the wiper arm $m^3$ when in the relative position shown in Fig. 1, will be driven by the shaft $s^3$ in synchronism with these other parts; but the shape of the collar C permits the wiper arm $m^3$ to have a certain amount of lost motion, shown as extending through an angular distance of about 90 degrees. The hub of this wiper $m^3$ is connected as indicated in dotted lines with a ratchet wheel 108 adapted to be advanced step by step by a spring pawl $s^7$ carried on the stem of a reciprocating armature $r^{25}$ of the selector magnet $M^2$. The purpose of this construction will be clear when it is understood that the three contacts $c^{26}$, $c^{27}$ and $c^{31}$ and the corresponding three contacts $c^{32}$, $c^{33}$ and $c^{34}$ constitute opposite terminals of the circuits of the several controlling relays $R^6$, $R^7$ and $R^8$, by means of which one or the other of two complete receiving systems such as shown in Figs. 1 and 2, can be locked out and rendered unresponsive to subsequent impulses. If the wiper arms $m^3$—$m^4$ were simply driven synchronously over these pairs of contacts, the circuits of the several relays would be closed in succession at every rotation, and of course selection by this means would be impossible. The ratchet 108 and the lost motion of the wiper arm $m^3$ enable us to control the time of this simultaneous contact, so that sending one, two or three impulses (assuming three pairs of contacts as shown) we can effect an operative closure of any one of the three circuits at will. In other words, if the relay $R^{10}$ receives three impulses, as a preliminary to sending operating impulses, the first will start the motor M, and thereby start the shaft $s^3$ and its attached parts to rotating; this same impulse will also energize magnet $M^2$ and set the wiper arm $m^3$ at once on the contact $c^{26}$, that is to say one step in advance of the wiper $m^4$. The second impulse will advance the wiper $m^3$ still another step, and the third impulse another step; so that only one wiper at a time will pass over the associated contacts $c^{26}$—$c^{32}$, $c^{27}$—$c^{33}$, and the wiper arm $m^4$ will have to be driven completely around to $c^{34}$ before simultaneous contact will be effected between it and its mate $c^{31}$. By sending two impulses, the simultaneous contact will of course be produced at the points $c^{27}$—$c^{33}$, and by sending a single impulse it can be produced at $c^{26}$—$c^{32}$. Thus we have at the outset a means for affecting one or the other of the relays $R^6$, $R^7$ or $R^8$, and thereby determining which torpedo or which boat or which balloon shall receive the controlling impulse to follow, and which of them shall be locked out.

The contacts at 41 are opened by the spring finger $s^5$ after the cam 55 has rotated through a sufficient distance for the arm $m^3$—$m^4$ to have passed over all the controlling relay contacts. The relay $R'$ is thereby unlocked, on each one of the torpedoes or other agencies under control, and the apparatus is ready for the selective controlling impulses to follow. The contacts $c^{28}$—$c^{35}$, $c^{30}$—$c^{36}$, etc., are connected in pairs to the circuits of the operating relays $R^2$, $R^3$, etc., and these relays are selectively controlled in the second half of the rotation of the switch by means of the selector magnet $M^2$, in the same manner as before. This control is exercised however on that particular boat or other agency which is left free and unlocked, and not on any which is locked out. The locking out is controlled through a normally closed circuit 47—50—51, including contacts $r^{11}$ controlled by the release relay $R^{11}$ in Fig. 2, and the circuit of this release relay is placed on the last contact $c^{25}$, closed by the wiper arm $m^3$ just before the end of its rotation. All combinations previously set up are thereby released, and all parts restored to the position shown in Figs. 1 and 2, ready for fresh selection and control.

The relays $R^6$ to $R^8$, in the third division are of ordinary type, provided with locking windings or locking contacts without double winding, if so desired. We should state in this connection that we have shown separate branch circuits, separate batteries, and separate relay windings, throughout these diagrams in order to render the circuits quite clear and easy to trace, without any chance crosses or short circuits. In practice however, it is possible and often desirable for reasons of economy, to employ a much smaller number of batteries, or even a single set of cells for all the circuits, and various combinations can be made in the wiring which will be sufficiently apparent to those skilled in the art from this suggestion. The relays $R^2$, $R^3$, $R^4$ and $R^5$ in the fourth division are also of ordinary or any desired type, and have locking windings, closed on the same common locking circuit 47—50—51, controlled by the common release relay $R^{11}$. It is to be understood that these relays are connected, for purposes of direct control or actuation of the torpedo, balloon, or other agency under control. For example, relay $R^2$ by means of a suitable armature, may either mechanically or electrically control a throttle or power switch and thereby control the propeller. Relay $R^3$ may control the reversing mechanism or links, relay $R^4$ the exploding mechanism, etc. We have shown these relays, however as controlling the steering mechanism, which falls under the fourth division. It comprises a rudder X (shown diagrammatically in dotted lines only) having a worm gear $G^6$ rigidly secured to the head of its post $s^5$, this gear being driven by a worm $G^5$ on the shaft $s^4$ of the shunt wound motor $M^3$, the field connections of which are constant and the armature connections reversible through a pole changer P, whereby the motor can be driven in either direction to turn the rudder one way or the other. Three positions are indicated for the rudder, which of course may be multiplied, but it is turned positively into either one of these three positions, which are "midships", "hard aport", and "hard a-starboard." To set the helm hard a-starboard, the gear $G^6$ is rotated clockwise, by means of the relay $R^3$. To set it midships, it is rotated from either extreme position (according to the position of the pole changer P) by energizing the relay R; and to put it hard aport, it is rotated by energizing the relay $R^5$. Of course these relays can be multiplied so that the rudder can be set at any desired angle, with certainty and precision, and additional relays can be employed to control the other pieces of apparatus mentioned or any that may be found desirable or necessary.

With the foregoing description of the apparatus, and in view of the disclosures in the prior art including the patents hereinbefore cited, it is thought that operation of our system will now be understood.

Operation: The circuits and apparatus shown in Fig. 1 are common to both boats (No. 1 and No. 2). Fig. 2 shows the circuits of boat No. 1 in which the relay $R^9$ is controlled through a front contact on the relay $R^6$. The relay circuit for boat No. 2 is the same as that for boat No. 1 with the exception that the relay $R^9$ is controlled through a front contact on the relay $R^7$. In both cases the relay $R^6$ is responsive to one selective impulse and the relay $R^7$ to two selective impulses. When one selective impulse is sent the relays $R^6$ of both boats are energized and in boat No. 1 the circuit of relay $R^9$ is completed through a front contact of relay $R^6$ and the relay $R^9$ attracting its armature opens the circuit of the main battery $B^7$ which supplies current for the operating relays in that boat, while the relay $R^9$ remaining deënergized in boat No. 2 the circuits of its operating relays remain connected to the main battery so that this boat is responsive to the operating impulses. The relay $R^8$ which is connected the same in both boats, as shown in Fig. 2, is responsive to three selective impulses and used for the simultaneous selection of both boats. Assuming that number 2 boat is to be selected for operation, the boat No. 1 is disabled or rendered nonoperable in the following manner: One impulse acting on the relay $R^{10}$ causes that relay to momentarily attract its armature $r^{10}$ which completes the circuit of the motor start magnet MS over the following path: battery $B^1$, 1, $r^{10}$, 2, 3, MS, 4, contact arm $m$, 5, and back to battery $B^1$. The magnet MS attracting its armature $m'$ permits the contact arms $m$ and $m^2$ to drop which completes the circuit of the motor M and energizes magnets $M'$ and $M^2$ and relay $R^1$, simultaneously. The circuit of the motor M may be traced from battery $B^6$, 6, $m^2$, 7, M, 8, and back to battery $B^6$. The circuit of magnets $M^2$ and $M^1$ and relay $R^1$ which are in series may be traced as follows: Battery $B^1$, 5, $m$, 9, $M^2$ 10, 11, 41, 12, $R^1$, 13, $M'$, 14, battery $B^2$, 15, 2, $r^{10}$, 1 and back to battery $B^1$. The attraction of armature $r'$ completes a locking or holding circuit from battery $B^2$, 15, 18, $r'$, 17, 11, 41, 12, $R'$, 13, $M'$, 14 and back to battery $B^2$. The energization of magnet $M^2$ causes the ratchet 16 to be stepped around one step which steps the arm $m^3$ around to the contact $c^{26}$. The energization of magnet $M^1$ causes the idler $G^3$ to be brought into mesh with the gears $G^2$ and $G^4$ which causes the shaft $s^3$ to rotate and with it the wiper arm $m^4$ and the collar C. When the arm $m^4$ becomes parallel to the arm $m^3$ or reaches the mate of the contact to which $m^3$ was primarily stepped, the offset in collar C striking the pin $p$ causes the arm $m^3$ to turn with the arm $m^4$ until both arms reach their respective third contacts $c^{31}$ and $c^{34}$ when the magnet $M^1$ is deënergized and the idler $G^3$ thrown out of mesh which causes the arms to come to rest in this position. The deënergization of magnet $M^1$ is brought about in the following manner: The spring $s^5$ is fixed in such angular relation to the arm $m^4$ that it operates to actuate the momentary break contact 41, in the manner hereinbefore described and at the instant that said arm reaches the third contact $c^{34}$. This break being included in the locking circuit of relay $R^1$ and magnet $M^1$ causes them to be deënergized, whereupon the armature $r^1$, falling back, opens said locking circuit.

The transfer switch 56 is actuated by the cam 55 in such a manner as to cause the contact arm 45 to break connection with conductor 28 and connect with conductor 22 and reserve said connection until the wiper arms come to rest on their third contacts when the cam 55 rotates out of engagement with the roller of the switch 56 permitting it to fall back to its normal position with the arm 45 again in contact with conductor 28 as shown. The arms $m^3$ and $m^4$ in sweeping over the contacts as described, complete the energizing circuit of relay $R^6$ (Fig. 2) on reaching their respective contacts $c^{26}$ and $c^{32}$, as follows: wiper arm $m^3$, contact $c^{26}$, 26, (26 Fig. 2) $R^6$, 32, (32 Fig. 1) $c^{32}$, $m^4$, 42, 39, (39 Fig. 2) battery $B^7$, 40, $r^9$, 41, $r^8$, 43, $r^7$, 44, $r^6$, 22, (22 Fig. 1) 45, 16, 46, and back to contact arm $m^3$. The relay $R^6$ attracting its armature $r^{61}$ completes a circuit through its locking winding as follows: battery $B^8$, $r^{11}$, 47, 48, $r^{61}$, 49, ($R^6$), 50, 51, back to battery $B^8$. The attraction of armature $r^6$ of relay $R^6$ energizes relay $R^9$ by current from battery $B^9$, 52, $r^6$, 53, $R^9$ and back to battery $B^9$, and the attraction of armature $r^9$ opens the circuit of the main battery $B^7$ at 40 and 41. The main battery $B^7$ being now disconnected, the operating relays $R^2$, $R^3$, $R^4$ and $R^5$ are deprived of their battery supply which renders these relays nonresponsive to the circuit connections made by the wiper arms in sweeping over the remaining contacts which second movement of the wiper arms takes place with the second set of impulses which are operating impulses intended to act on the control mechanism of boat No. 2. This second set of impulses acting on the relay $R^{10}$ causes the shaft $s^3$ to again rotate and the arms $m^3$ and $m^4$ to sweep over the remaining contacts in a manner similar to that before described, the circuits of the relays not being affected, as the connection through brush 42, conductor 39, battery $B^7$, conductor 40, etc., is open at armature $r^9$. However when the arm $m^3$ reaches the contact $c^{25}$ the energizing circuit of the release relay $R^{11}$ is completed as follows: $m^3$, $c^{25}$, 25, (25 Fig. 1) $R^{11}$, 54, (54 Fig. 1) 46, and back to wiper arm $m^3$. The relay $R^{11}$ attracting its armature $r^{11}$ opens the locking circuit of relay $R^6$, and the armature $r^6$ falling back causes the relay $R^9$ to be deënergized which in turn releasing its armature, restores the connection from battery $B^7$ through conductor 40 to conductor 41. The wiper arms however continue to turn until they reach their first or dead contacts as shown in Fig. 1 whereupon the spring $s^6$ actuates the momentary break 41 and causes the wiper arms to come to rest in this position in a similar manner to that before described in the operation of the spring $s^5$, and the circuits and apparatus are restored to their normal condition as shown in the drawings, with the exception that the motor start MS remains in its actuated position.

Assuming that boat No. 1 is to be selected and boat No. 2 disabled, two impulses are sent to act upon the relay $R^{10}$, the first impulse starts the motor M, actuates the magnet M' which starts the shaft $s^3$ and also actuates the magnet $M^2$ to step the arm $m^3$ around to the first contact $c^{26}$ and causes a locking circuit through M', R' in series with the armature contact $r'$ as before described. The second impulse coming immediately after, causes the magnet $M^2$ to be energized a second time, and in the following circuit: battery $B^1$, 1, $r^{10}$, 2, 18, $r^1$, 17, 10, $M^2$, 9, $m$, 5, back to battery $B^1$. This energization of $M^2$ causes the arm $m^3$ to be stepped around to the second contact $c^{27}$ so that both arms $m^3$ and $m^4$ will not turn in unison until the arm $m^4$ reaches its second contact $c^{33}$. The arms continue to turn, however, until they reach their third contacts when the shaft $s^3$ ceases to rotate and the arms come to rest in the same manner as previously described. When the arms $m^3$ and $m^4$ reach their second contacts $c^{27}$ and $c^{33}$ respectively the energizing circuit of relay $R^7$ in each boat Nos. 1 and 2 is closed as follows: wiper arms $m^3$ $c^{27}$, 27 (27 Fig. 2), $R^7$, 33 (33 Fig. 1), $c^{33}$, $m^4$, 42, 39 (39 Fig. 2), battery $B^7$, 40, $r^9$, 41, $r^8$, 43, $r^7$, 44, $r^6$, 22 (22 Fig. 1), 45 (the contact arm 45 being held in electrical contact with conductor 22 by the action of the cam 55), thence over conductor 16, 46, and back to $m^3$. It will be remembered that in boat No. 2 the relay $R^9$ is controlled by a front contact on the relay $R^7$ instead of the relay $R^6$ as shown in Fig. 2 so that the relay $R^9$ in boat No. 2 is therefore energized which attracting its armature $r^9$ opens the circuit of battery $B^7$ and disables that boat in a manner similar to that described for boat No. 1. The relays $R^7$ in both boats, in attracting their armatures, lock themselves through armature $r^{71}$ in the following circuit: battery $B^8$, $r^{11}$, 47, 48, $r^{71}$, locking winding of $R^7$, 57, 50, 51 and back to battery $B^8$. As the control relay $R^9$ of boat No. 1 (Fig. 2) is not affected by the relay $R^7$ the connection from battery $B^7$ through 40 and 41 is unchanged.

Should it be desired to select both boats, three impulses are sent to operate the relay $R^{10}$ which causes the arm $m^3$ to be stepped three places in advance so that no circuits are completed until the arm $m^4$ engages the third contact $c^{34}$ whereupon the relay $R^8$ is energized by current over the following path: $m^3$, $c^{31}$, 31 (31 Fig. 2) $R^8$, 34 (34 Fig. 1) $c^{34}$, $m^4$, 42, 39 (39 Fig. 2) $B^7$, 40, $r^9$, 41, $r^8$, 43, $r^7$, 44, $r^6$, 22 (22 Fig. 2) 45, 16, 46, and back to arm $m^3$. The relay $R^8$ attracting its armatures, locks itself on battery $B^8$ through armature $r^{81}$ and a back contact on the release relay $R^{11}$ in the same manner as those previously described, and opens its energizing circuit and that of all the other selective relays at $r^8$. The second set of impulses, that is the operating impulses now affect the relay $R^{10}$ in such a way as to cause it to be energized at each impulse. In assuming that the purpose of these operating impulses is to actuate the rudder relay L, two impulses would be sent and the relay $R^{10}$ caused to attract its armature at each impulse. The first attraction of armature $r^{10}$ will start the shaft $s^3$ and cause the arm $m^3$ to be stepped one step in advance of the shaft and on to contact $c^{28}$ in the manner as before described, while the second attraction of armature $r^{10}$ causes the arm $m^3$ to take another step, magnet $M^2$ being energized this time through the shunt provided at $r^1$ and conductor 18 in the same manner as before described. The second step of the arm $m^3$ brings it into engagement with the contact $c^{30}$ and the arm $m^4$ coming into engagement with the corresponding contact $c^{36}$ completes the energizing circuit of relay $R^3$ as follows: wiper arm $m^3$, $c^{30}$, 30 (30 Fig. 2) $R^3$, 36, (36 Fig. 1) $c^{36}$, $m^4$, 42, 39, (39 Fig. 1) $B^7$, 40, $r^9$, 41, 58, $r^5$, 59, 60, $r^4$, 61, 62, $r^3$, 63, 64, $r^2$, 28, (28 Fig. 1) 45, (the spring 45 now being in contact with 28) thence through 16, 46, and back to arm $m^3$. The actuation of relay $R^3$ completes a circuit through its locking winding by the attraction of armature $r^{31}$ as follows: battery $B^8$, $r^{11}$, 47, $r^{31}$, locking winding of $R^3$, 65, 50, 51 and back to battery $B^8$. The attraction of armature $r^3$ opens the circuit through battery $B^7$, conductor 40, and the back contacts of the operating relays, which circuit was traced in connection with the energization of relay $R^3$, and as the operating relays $R^2$, $R^3$, $R^4$ and $R^5$ receive their energizing current from the battery they cannot be affected by the arms $m^3$ and $m^4$ passing over the remaining contacts. The attraction of armature $r^3$ also completes the energizing circuit of the rudder relay L as follows: battery $B^{10}$, L, 63, $r^3$, 64 and back to battery $B^{10}$. The arm $m^3$ coming into engagement with contact $c^{25}$ causes the release relay $R^{11}$ to be energized which in attracting its armature $r^{11}$ opens the locking circuit of relay $R^3$, and the arms $m^3$ and $m^4$ passing on to their normal position come to rest on the dead contacts as indicated in Fig. 1, in the same manner as previously described. Similarly the operating relays $R^2$, $R^4$ or $R^5$ may be energized respectively by 1, 3 or 4 operating impulses, the rudder relays C and R being controlled by the relays $R^4$ and $R^5$ as shown. The relay $R^2$ may be used for any other operation such for example as firing.

The relays C, L and R control the movements of the rudder to the center, left or right respectively. Assuming that the rudder is in its normal or center position as represented in the diagram Fig. 2 and it is desired to shift it to the right, the relay L is caused to be energized by the appropriate number of operating impulses as before described, and attracting its armature $r^{22}$ completes the circuit of the rudder shifting motor $M^3$ as follows: battery $B^{11}$, 66, arm 67, of the pole changer P, 68, $M^3$, 69, 70, arm 71, 72, 76, contact 77, contact arm $m^5$, 78, 79, $r^{22}$, 80 and back to battery $B^{11}$. The field $f$ of the motor is connected in shunt relation to this circuit by conductors 105 and 106. The motor $M^3$ transmitting power through gears $G^5$ and $G^6$ to the rudder shaft $s^5$ causes said shaft to rotate until the pin $p'$ strikes the contact arm $m^5$ and throws the same out of engagement with the contact 77 and into engagement with the contact 81. This opens the motor circuit just traced, causing the rudder to come to rest in its extreme left position, and completes the energizing circuit of magnet $M^4$ as follows: battery $B^{12}$, $M^4$, 82, $m^5$, 81, 83 and back to battery $B^{12}$. The actuation of magnet $M^4$ shifts the pole changer P and at the same time locks itself through the following circuit: battery $B^{13}$, 84, 85, $r^{23}$, 86, 87, $m^6$, contact 88, 89, locking winding of $M^4$, 99 and back to battery $B^{13}$.

From the extreme left position the rudder may be brought either to the center or right by the actuation of relay C or R respectively. Assuming that it is desired to bring the rudder back to its center or normal position the relay C is energized and upon attracting its armature $r^{24}$, completes the circuit of the motor $M^3$ as follows: battery $B^{11}$, 66, 67, 100 (the pole changer P now being held over to the left by the magnet $M^4$) thence through 69, $M^3$, 68, 71, 72, 75, and as the contact arm $m^7$ is now in engagement with the contact 75 by virtue of the lug $p^2$ having been revolved to the left, this circuit is continued through $m^7$, conductor 101, armature $r^{24}$, 80 and back to battery $B^{11}$. The motor again turns the rudder, but this time in a reverse direction, the gear $G^6$ turning counter-clockwise until the lug $p^2$ strikes the arm $m^7$ and causes it to again disengage from the contact 75 which brings it to the position shown in the drawing and opens the motor circuit, as just traced, causing the rudder to come to rest in the center or normal position. The stud $p'$ on leaving the arm $m^5$ permits it to return to its normal position which opens the primary energizing circuit of the magnet $M^4$ at contact 81, that magnet however, remaining energized through the locking circuit as previously described. Assuming that the rudder has been in its extreme left position ("helm aport") and it is desired to bring it to the extreme right position, the relay R will be energized and attracting its armature $r^{20}$ completes the circuit of the motor from battery $B^{11}$ through 66, 67, 100, 69, 68, 71, 72, to 73, $m^6$, 87, armature $r^{20}$, 80 and back to battery $B^{11}$, and as the pole changer P is held over to the left, the rudder and gear $G^6$ are turned counter-clockwise. Magnet $M^4$ remaining energized through its locking winding, the gear $G^6$ continues to turn until the stud $p^3$ engages the arm $m^6$ and causes it to disengage the contact 73 and open the contact 88, the motor circuit is broken and the rudder comes to rest in its extreme right position that is with the "helm a-starboard," and the locking or holding circuit of $M^4$ now being open at contact 88 causes the magnet $M^4$ to be deënergized releasing the armature 84 and permitting the pole changer P to fall back to its normal position as indicated in the drawing. To bring the rudder back to the center or "midship" position, the relay C is energized and on attracting its armature $r^{24}$, completes the circuit of the motor from battery $B^{11}$ through the arms of the pole changer and to contact 75 as before described and thence through $m^7$, 101, $r^{24}$, 80 and back to battery $B^{11}$. The pole changer P being in its normal position, the rudder and gear $G^6$ are turned clockwise until the lug $p^2$ engages the right hand side of the arm $m^7$ and throws it to the position shown in dotted lines whereupon said arm disengages the contact 75 and breaks the motor circuit causing the rudder to come to rest in its normal or midship position. It will be remembered that when the rudder is in the extreme right position, the arm $m^6$ is out of engagement with the contact 73, and the pole changer in its normal position as shown and should it be desired to shift the rudder from this position to the left, the relay L will be energized completing the circuit of the motor $M^3$ from battery $B^{11}$ through the arms of the pole changer and to conductor 72 as before described, and thence through conductor 72, 76, 77, $m^5$, 78, 79, $r^{22}$, 80, $B^{11}$. The pole changer being in its normal position, gear $G^6$ will turn clockwise until the stud $p'$ strikes the arm $m^5$ causing it to break contact with 77 whereupon the motor circuit is opened and the rudder comes to rest in its left position with helm aport. The arm $m^5$ coming into engagement with the contact 81 causes magnet $M^4$ to be energized, and held so through its locking circuit, so that the pole changer is in position to reverse the motor armature connection.

Although the above describes the manipulation of two single boats, any number of boats or torpedoes or the like may be operated by arranging them in two groups, all the boats of one group being identical in every detail with boat No. 1, and those of the other group identical with boat No. 2. With this arrangement all the boats of either one or both groups may be operated simultaneously in the same manner as that described for the single boats.

Having thus described our invention what we claim and desire to secure by Letters Patent is:—

1. In an electrical system of control having suitable transmitting apparatus, the following receiving apparatus responsive thereto: a receiving relay, a switch having actuating means controlled by said relay and contact members controlled by said actuating means, operating relays controlled by the switch, and means for producing asynchronous action of the switch members through a predetermined part of their travel for selective purposes.

2. In an electrical system of control having suitable transmitting apparatus, the following receiving apparatus responsive thereto: a receiving relay, switch members controlled thereby, operating relays controlled by the switch members, and means controlled by the receiving relay for producing asynchronous action of the switch members through a predetermined part of their travel for selective purposes.

3. In an electrical system of control having suitable transmitting apparatus, the following receiving apparatus responsive thereto: a receiving relay, switch members controlled thereby, operating relays controlled by the switch members, and means including an electromagnet controlled by the receiving relay for producing asynchronous action of the switch members through a predetermined part of their travel for selective purposes.

4. In an electrical system of control having suitable transmitting apparatus, the following receiving apparatus responsive thereto: a receiving relay, a switch controlled thereby, operating relays controlled by the switch, said switch having a motor driven spindle, and a fixed and movable arm thereon with coöperating contacts for said arms connected to the relay circuits in corresponding pairs, and means for producing an angular variation between the fixed and movable arms on the spindle during part of the travel of the switch, whereby simultaneous contact for closure of any desired relay circuit may be produced at will.

5. In an electrical system of control having suitable transmitting apparatus, the following receiving apparatus responsive thereto: a receiving relay, a switch controlled thereby, operating relays controlled by the switch, a motor driven spindle for said switch, and two wiper arms on said spindle one fixed thereto and the other having lost motion thereon, but adapted to be driven thereby synchronously with the fixed wiper, and an electromagnet controlled by the receiving relay adapted to act on said movable wiper arm independently of the motor drive, whereby an angular difference in the positions of the two wipers may be produced during any desired portion of the switch travel.

6. In an electrical system of control having suitable transmitting apparatus, the following receiving apparatus responsive thereto: a receiving relay, a switch controlled thereby, operating relays controlled by the switch, a motor driven spindle for said switch, a pair of wiper arms thereon, one fixed thereto and the other having lost motion but adapted to be driven thereby synchronously with the fixed wiper, and a pawl and ratchet mechanism therefor with an actuating electromagnet therefor included in a circuit controlled by the receiving relay.

7. In an electrical system of control having suitable transmitting apparatus, a plurality of receiving devices responsive thereto, each comprising a receiving relay, lockout or disabling mechanism, and actuating mechanism, together with a selective switching means controlled by said receiving relay, having a succession of positions in which said lockout mechanism and actuating mechanism are adapted to be actuated always successively in the order named, whereby each receiving device will be either locked out or disabled before any actuating impulses are received.

8. In an electrical system of control having a suitable transmitting device, the combination of a receiving device, an electrically actuated operating device selectively controlled thereby, a source of current therefor, and a pole changer automatically actuated by said receiving device, after preparatory action by said operating device, for reversing the direction of operation of said device at will.

9. In an electrical system of control having a transmitting device, a plurality of receiving equipments, each comprising a receiving relay, a motor driven two part switch and a selector magnet for producing asynchronous action of the parts thereof, said magnet responsive directly to the action of the receiving relay, a lock-out relay for each equipment controlled in the first portion of the action of said switch as determined by said magnet, and operating mechanism adapted to be controlled thereafter by the switch when not locked out.

10. In an electrical system of control having a transmitting device, a plurality of receiving equipments, each comprising a receiving relay, a motor driven two part switch and a selector magnet for producing asynchronous action of the parts thereof, said magnet responsive directly to the action of the receiving relay, a lock-out relay for each equipment controlled in the first portion of the action of said switch as determined by said magnet and operating mechanism adapted to be controlled thereafter by the switch, said operating mechanism comprising mechanical moving parts, relays controlling the same, and selective circuit connections between said relays and contacts of the switch.

11. In an electrical system of control having a transmitting device, a plurality of receiving equipments, each comprising a receiving relay, a motor driven two part switch and a selector magnet for producing asynchronous action of the parts thereof, said magnet responsive directly to the action of the receiving relay, a lock-out relay for each equipment controlled in the first portion of the action of said switch as determined by said magnet, operating relays adapted to be controlled thereafter by the switch when not locked out, mechanism controlled by said relays, self-locking circuits for all of said relays, and a release relay containing normally closed contacts in the locking circuit of all the other relays, and having its energizing circuit connected to contacts closed at the end of a full cycle of operation of the switch.

LEE B. CLARK.
RAYMOND A. CLARK.

Witnesses:
L. A. FOSTER,
NINA L. FOSTER.